(12) United States Patent
Schluessler et al.

(10) Patent No.: US 12,430,140 B2
(45) Date of Patent: Sep. 30, 2025

(54) PER-LANE POWER MANAGEMENT OF BUS INTERCONNECTS

(71) Applicant: Intel Corporation, Santa Clara, CA (US)

(72) Inventors: Travis T. Schluessler, Berthoud, CO (US); Huimin Chen, Beaverton, OR (US); Selvakumar Panneer, Portland, OR (US); Zhengmin Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 17/468,179

(22) Filed: Sep. 7, 2021

(65) Prior Publication Data

US 2023/0076468 A1  Mar. 9, 2023

(51) Int. Cl.
  *G06F 9/445* (2018.01)
  *G06F 9/4401* (2018.01)
  *G06F 13/20* (2006.01)

(52) U.S. Cl.
  CPC ........ *G06F 9/44505* (2013.01); *G06F 9/4418* (2013.01); *G06F 13/20* (2013.01)

(58) Field of Classification Search
  CPC .................................................. G16H 40/67
  See application file for complete search history.

(56) References Cited

U.S. PATENT DOCUMENTS

| 8,762,748 B1* | 6/2014 | Zhang | G06F 1/3206 |
| | | | 713/340 |
| 10,873,525 B2 | 12/2020 | Berchanskiy et al. | |
| 10,964,087 B2 | 3/2021 | Burke et al. | |
| 2010/0049881 A1* | 2/2010 | Manor | G06F 1/3215 |
| | | | 710/18 |
| 2011/0231685 A1* | 9/2011 | Huang | G06F 1/3253 |
| | | | 710/14 |
| 2017/0373879 A1 | 12/2017 | Zhang et al. | |
| 2019/0155361 A1 | 5/2019 | Berchanskiy et al. | |
| 2020/0371579 A1 | 11/2020 | Selvam et al. | |

FOREIGN PATENT DOCUMENTS

WO    2019117960 A1    6/2019

OTHER PUBLICATIONS

Iqbal, Muhammad Faisal, et al., "Efficient Traffic Aware Power Management for Multicore Communications Processors," The 8th ACM/IEEE Symposium on Architectures for Networking and Communications Systems, Oct. 29-30, 2012, Austin TX, US; 11 pages.
EPO Feb. 1, 2023 Extended European Search Report from corresponding EP Application No. 22188836.5; 10 pages.
Office Action, EP App. No. 22188836.5, Jul. 5, 2024, 8 pages.

* cited by examiner

*Primary Examiner* — Henry Tsai
*Assistant Examiner* — Juanito C Borromeo
(74) *Attorney, Agent, or Firm* — NICHOLSON DE VOS WEBSTER & ELLIOTT LLP

(57) ABSTRACT

A method includes receiving a request for a transfer of data on a bus of a computing device; determining a direction for the transfer, at least in part based on the request; determining a quantity of data for the transfer, at least in part based on the request; determining a power state for a lane of the bus, at least in part based on the direction and the quantity of data for the transfer; and setting the power state for the lane of the bus.

19 Claims, 4 Drawing Sheets

PER-LANE POWER MANAGEMENT OF BUS INTERCONNECTS

BACKGROUND

Technical Field

This disclosure relates to routing of data in a communication bus and, in particular, to controlling power states of lanes of such a bus, based on a future load of the bus.

Related Art

Modern systems commonly connect peripheral devices such as graphics processing units (GPUs), solid-state memory devices (SSDs), and network devices to a host central processing unit (CPU) via a bus interconnect.

Conventionally, load predictors have been used to control power consumption in systems. Common approaches to prediction include double exponential smoothing, neural networks, and wavelet transform based predictors.

DETAILED DESCRIPTION

Future versions of these interconnects (such as Peripheral Component Interconnect Express [PCIe] gen6) might support per-lane power management to place individual data lanes in each communication direction in a low power state to save power.

Conventional approaches that make use of per-lane power state control use hardware-based measurement to change power states in response to demand. When the demand goes up, more lanes are powered up; when the demand goes down, more lanes are powered down.

In an additional method for determining when and how to manage bus lane power states, a software component examines a workload's requests and determines when those requests match a specific profile (e.g., a file transfer) and then configures the bus lanes for a pre-identified lane power state configuration (e.g. 3× reception lanes+1× transmission lane).

The responsive approach to managing lane power states delivers suboptimal performance for burst-y traffic because the bus lanes are not powered up at the beginning of the transfer interval.

Some implementations of this disclosure use knowledge about future workload demand to control bus lane power states, thus improving system performance and efficiency.

Some implementations according to the present disclosure are advantageous compared to the burst approach in several specific ways:

Select implementations of the present disclosure can analyze workload operations to determine bus transaction size, latency and bandwidth use. Conventional implementations identify a "class of work" such as "file transfer." The present disclosure identifies specific resources to be transferred, their size, and latency sensitivity (e.g., whether the resource should be provided immediately (latency sensitive, or it can be transferred slowly using fewer lanes).

Particular implementations of this disclosure use the aforementioned details to determine a lane configuration based on an upcoming operation including the amount of data to be transferred and the latency/bandwidth sensitivity of the computing system to that transfer. Conventional implementations use "classes" of operations to choose from a set of predefined lane configurations, which do not result in an optimal lane power configuration for all lanes at the beginning of the operation.

Various implementations of this disclosure control bus power states to wake and sleep at a particular time for performance/efficiency. Conventional implementations make no provision for determining wake/sleep times: those implementations simply provide for controlling the lane power states.

Figure 1:
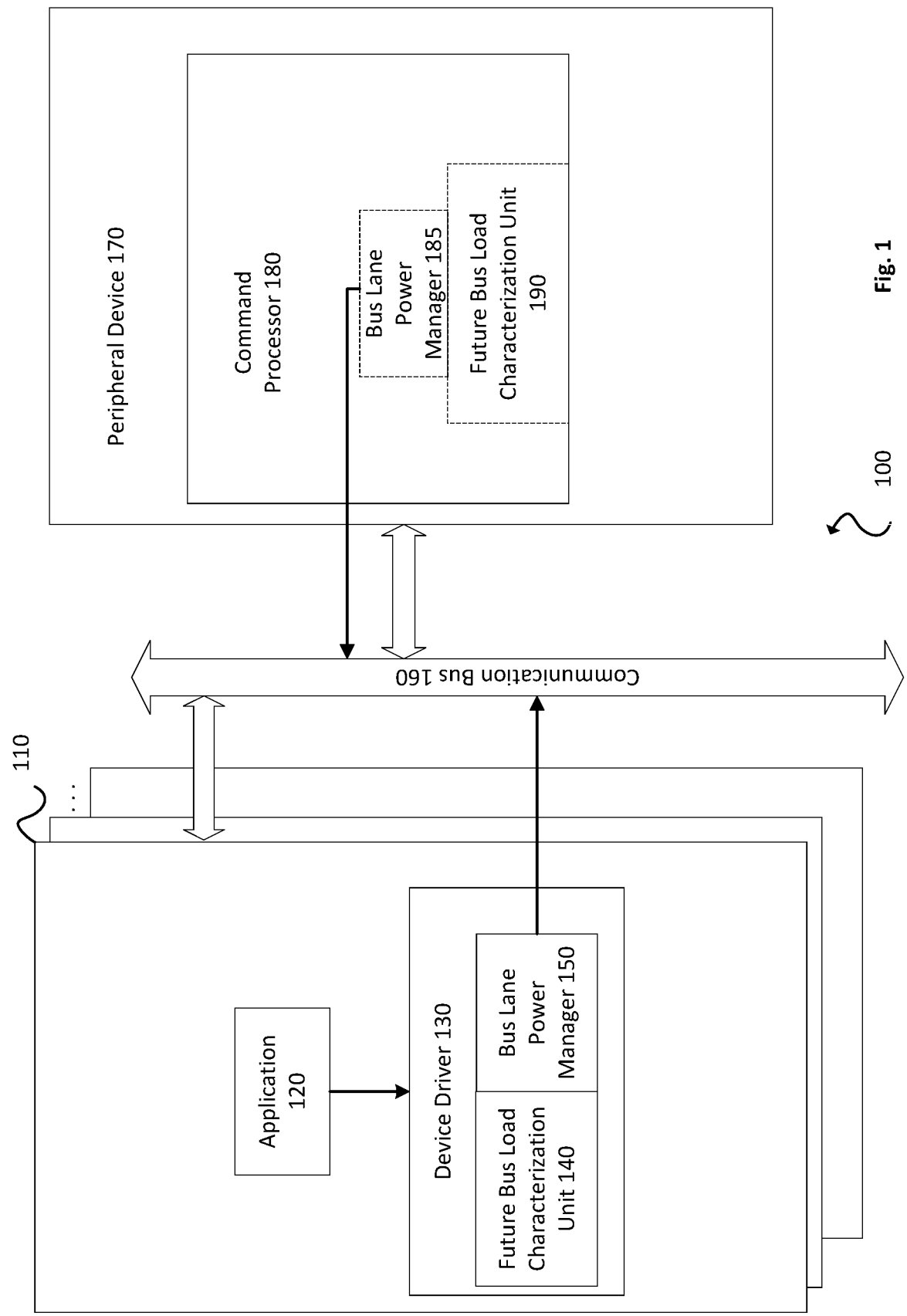
FIG. 1 illustrates an exemplary computing device, according to an implementation of the present disclosure.

FIG. 1 illustrates an exemplary computing device 100, according to an implementation of the present disclosure. The computing device 100 is an example of a host and includes one or more CPUs 110, an application 120, a device driver 130, a future bus load characterization unit (FBLCU) 140, a bus lane power manager 150, a communication bus 160, a peripheral device 170, a command processor 180, an optional bus lane power manager 185, and an optional FBLCU 190.

One or more of the CPUs 110 include the application 120, which executes on the one or more of the CPUs 110. The application 120 instructs the one or more of the CPUs 110 to send data to and receive data from the communication bus 160. For example, the application 120 can instruct the one or more of the CPUs 110 to send data to a GPU over the communication bus 160. As another example, the application 120 can instruct the one or more of the CPUs 110 to retrieve data from a solid-state memory device via the communication bus 160.

The application 120 can be any application, including a productivity application, an educational or informational application, an entertainment application (such as a game or video), and any combination of these categories (e.g., infotainment).

The one or more of the CPUs 110 also include a device driver 130 that is loaded onto the one or more of the CPUs 110. The device driver 130 is a driver for the one or more CPUs 110 to interact with the peripheral device 170.

The device driver 130 can include the FBLCU 140 and the bus lane power manager 150.

The FBLCU 140 monitors upcoming actions on the one or more CPUs 110. For example, the FBLCU 140 characterizes a future load of the communication bus 160, based on a direction of a requested transfer and a quantity of data for the requested transfer, as detailed herein.

Based on these actions, the FBLCU 140 determines the appropriate power state in each direction for each lane of the communication bus 160. The FBLCU 140 also determines wake or sleep times for the lanes to implement those power states.

The bus lane power manager 150 uses power state information to raise (e.g., "wake") or lower (e.g., "sleep") power states on individual lanes of the communication bus 160. For example, the bus lane power manager 150 transmits power management commands to the communication bus 160 at appropriate times.

The communication bus 160 is an interface (e.g., a buss interconnect) between the one or more CPUs 110 and the peripheral device 170. The communication bus 160 can conform to an interface standard, such as Peripheral Component Interconnect Express (PCIe) or Compute Express Link (CXL). The communication bus 160 includes 4, 8, or 16 lanes, for example. In some implementations, the communication bus 160 includes 32 or more lanes.

In many implementations, lanes of the communication bus 160 communicate bi-directionally between the one or more of the CPUs 110 and the peripheral device 170. In other implementations, relatively few (e.g., one or two) lanes of the communication bus 160 are dedicated to uni-directional communication, while the remaining lanes of the communication bus 160 can communicate bi-directionally.

In some implementations, the computing device 100 can include within its housing the peripheral device 170. In other implementations, the peripheral device 170 is included in its own housing external to the computing device 100. The peripheral device 170 can be a GPU, a storage device, or a network interface, for example. In an implementation in which the peripheral device 170 is a GPU, the GPU can contain a command streamer. In an implementation in which the peripheral device 170 is a storage device, the storage device can be an SSD. In an implementation in which the peripheral device 170 is a network interface, the network interface can be a network interface card (NIC), for example.

The peripheral device 170 includes the command processor 180. The command processor 180 executes commands instructed by the device driver 130. Examples of these commands in the case of peripheral device 170 being a GPU can include compute, data transfer from the computing device 100 to the peripheral device 170, and data transfer from the peripheral device 17 to the computing device 100. Examples of these commands in the case of peripheral device 170 being an SSD can include reading data from the SSD or storing data to the SSD.

The peripheral device 170 also includes optional bus lane power manager 185. The bus lane power manager 185 can operate similarly to bus lane power manager 150. For example, the bus lane power manager 185 transmits lane power management commands to the communication bus 160. In some implementations including the bus lane power manager 185, the bus lane power manager 150 in computing device 100 can be omitted.

The peripheral device 170 optionally includes FBLCU 190, which can be implemented as software or hardware running on the peripheral device 170. The inclusion of the FBLCU 190 can provide flexibility to avoid sending information from the computing device 100 to the peripheral device 170.

In a further implementation, the FBLCU 140 on the computing device 100 can coordinate with the FBLCU 190 on the peripheral device 170 to provide an enhanced determination of power states for the communication bus 160.

Once the peripheral device 170 generates or receives information about a future transfer of the communication bus 160, the FBLCU 190 of the peripheral device 170 can determine a start time for the transfer based on an internal scheduler of the peripheral device 170. In the case of peripheral device 170 being a GPU, the command streamer can indicate start and end times for waking or sleeping lanes of the communication bus 160. The bus lane power manager 185 can set power states of the lanes of the communication bus 160 to accommodate the wake cycle time, such that each lane of the communication bus 160 is in an appropriate power state when the transfer begins.

Thus, some implementations of the FBLCU 140 analyze traffic loads on the lanes of the communication bus 160 in real-time as the work underlying the transfer is created. The FBLCU 140 can then preemptively alter power states of the lanes of the communication bus 160 before the transfer is transmitted on a lane of the communication bus 160.

In one example, the application 120 is a three-dimensional (3D) application that directs the device driver 130 to generate commands for execution on a GPU (e.g., peripheral device 170). When the device driver 130 creates these commands, the FBLCU 140 determines a quantity of data to be transferred across the communication bus 160 and the duration of time in which the transaction is to be completed.

For example, assume a command from the application 120 requests the GPU read a 2 MB buffer to perform a single draw operation. The FBLCU 140 then can record that request. Based on the request, the FBLCU 140 can determine a power state for each lane of the communication bus 160 in each direction. Initiating the power state of the bus lanes determined by the FBLCU 140 can deliver improved performance and efficiency during the time window of that operation (e.g., a time window of 16.66 ms for 6 ofps).

If the transfers are driven by the one or more CPUs 110, then the FBLCU 140 can determine a time when the one or more CPUs 110 will begin the transfers. Then, the bus lane power manager 150 adjusts the power states of the lanes of the communication bus 160 at an earlier time, based on the wake cycle time of the lanes of the communication bus 160. For example, the bus lane power manager 150 subtracts the wake cycle time from the time when the one or more CPUs will begin the transfers. Thus, the lanes of the communication bus 160 are in the correct power state at the beginning of the transfer.

On the other hand, the GPU (e.g., peripheral device 170) can drive the transfers on the communication bus 160. In this situation, the FBLCU 140 can embed information about the power states of the lanes of the communication bus 160 inside the command stream sent to the peripheral device 170. For example, this information can include the time when the GPU will begin the transfers. This power information can be encoded as a separate command for the GPU interpreted by the command streamer. The command streamer can then relay the signal at the appropriate time to the bus lane power manager 185.

In some implementations, the time when the GPU will begin the transfers is an absolute time. For example, the FBLCU 140 can indicate the time based on a number of clock cycles or a system clock. In other implementations, the time when the GPU will begin the transfers is a relative time. As an example of such an implementation, the FBLCU 140 can indicate the time relative to a draw dispatch.

In some implementations, the information embedded in the command stream also indicates the time when the bus lane power manager should adjust the power states of the lanes of the communication bus 160 (e.g., the difference between the transfer start time and the wake cycle time). Further, in alternative implementations, the FBLCU 190 can determine the start time of the transfers on the communication bus 160.

Figure 2:
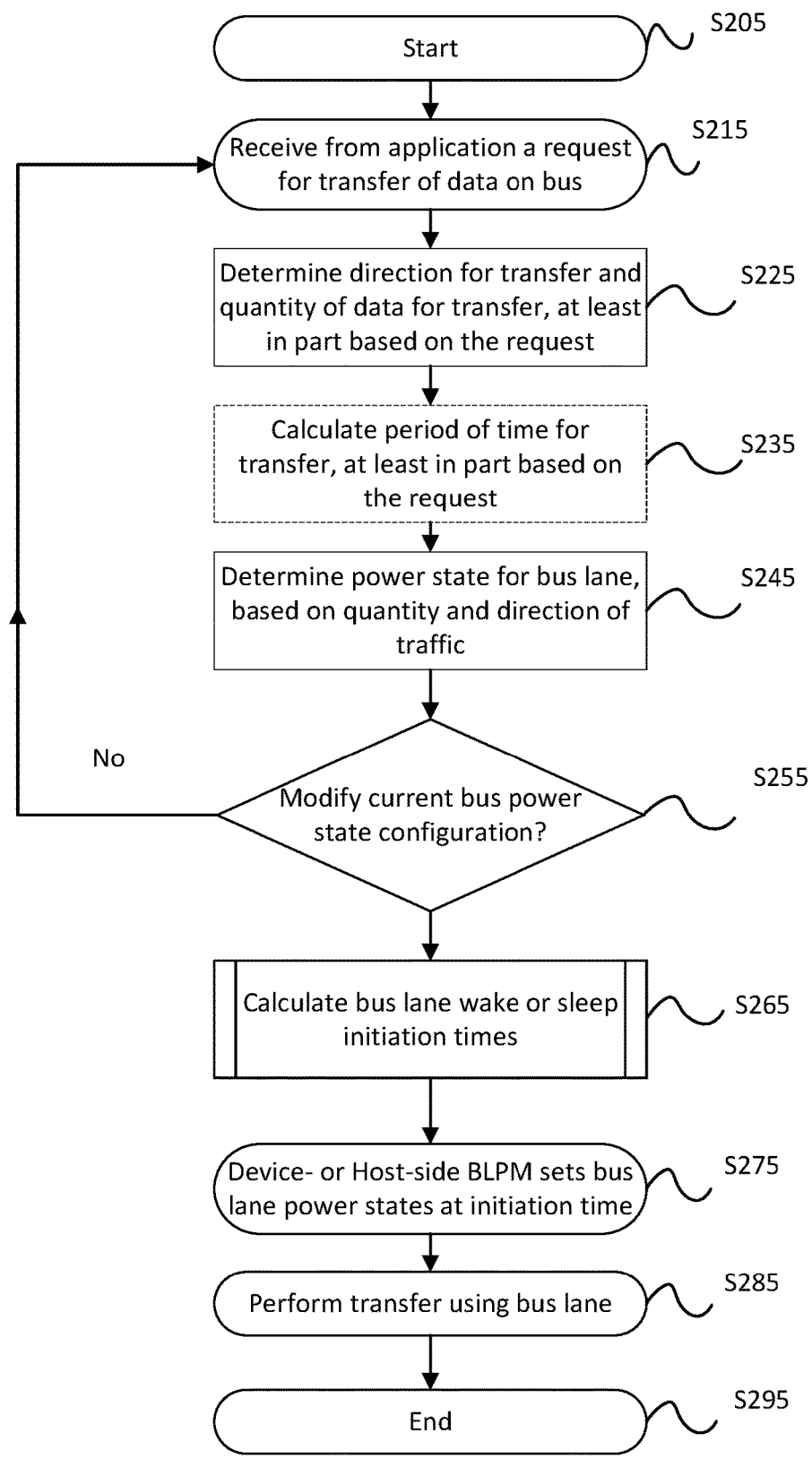
FIG. 2 shows an algorithm for a link power and bandwidth management flow, according to an implementation of the present disclosure.

FIG. 2 shows an algorithm 200 for a link power and bandwidth management flow, according to an implementation of the present disclosure.

Briefly summarizing, the link re-configuration of algorithm 200 can be triggered based on the real-time progress of the application 120, where the link re-configuration can be determined based on several factors. These factors include, but are not limited to, the direction of data transfer between the host 110 and peripheral device 170 and the bandwidth and the latency tolerance for the quantity of data to be transferred on the communication bus 160. The FBLCU 140 and/or the FBLCU 190 can collect and monitor a set of telemetry data regarding the resource utilization of a processing unit, the available memory space, etc. Based on the overall system capacity remaining and the progress of data processing, both the host 110 and the peripheral device 170 can define a set of triggers, such that the host 110 and/or the peripheral device 170 can initiate a data transfer on communication bus 160 ahead of time if certain thresholds are crossed.

The algorithm 200 begins at S205 and advances to S215. In S215, the FBLCU receives a request for a transfer of data on the communication bus 160 of computing device 100. The FBLCU receives the request from application 120 executing on the computing device 100, for example. In another example, the FBLCU receives the request from the command processor of peripheral device 170.

The algorithm 200 then advances to S225.

In S225, the FBLCU determines a direction for the transfer at least in part based on the request. For example, the FBLCU can determine the application 120 requests data be retrieved (e.g., uploaded) from a storage device (e.g., peripheral device 170). In another example, the FBLCU can determine the application 120 will transmit data from the one or more CPUs 110 (e.g., download) to a GPU (e.g., peripheral device 170).

The FBLCU also determines (e.g., calculates) in S225 a quantity of data for the transfer at least in part based on the request. In some instances, the request identifies a determinate quantity of data for a memory transfer. Such a memory transfer can be, for example, 1 megabyte, a file of a determinate size, a folder of a determinate size, or a drive of a determinate size.

Some implementations, where the peripheral device 170 is a network interface, function analogously to implementations in which the peripheral device 170 is a storage device.

In other instances, the application 120 requests an indeterminate quantity of data for a transfer. For example, the request can be for a frame render by a GPU. In such an instance, the FBLCU can determine the quantity of data is equal to a quantity of data (e.g., the number of bytes) used by the GPU when the GPU rendered a previous frame.

More sophisticated quantity determinations are contemplated. For example, the FBLCU can determine the quantity of data is equal to an average quantity of data used by the GPU when the GPU rendered plural previous frames. The FBLCU alternatively can determine a type of GPU draw in the request and determine the quantity of data for the transfer is equal to a quantity of data used by the GPU when the GPU previously rendered a frame for the same type of GPU draw.

In another example, the FBLCU identifies, within a queue, a first group of operations that transfer known quantities of data, as well as a second group of operations that transfer unknown quantities of data. That is, the first group of operations transfer a determinate quantity of data. On the other hand, the FBLCU uses historical averages or such to determine an approximation of the unknown quantity of data. The FBLCU adds the determinate quantity of data to the approximation of the unknown quantity of data to determine a sum. The FBLCU then determines the active lane count based on the sum. The algorithm 200 then advances to optional S235.

In S235, the FBLCU optionally determines (e.g., calculates) a period of time for the transfer, at least in part based on the request. In particular, the FBLCU determines the period, based on the quantity of data for the transfer or the use of the request.

Regarding quantity, a quantity might be too small to justify waking up more lanes of the communication bus 160. For example, if the FBLCU determines the quantity does not exceed a predetermined threshold, then the FBLCU can calculate the period for the transfer, based on a first predetermined number of lanes. This first predetermined number of lanes can be either a single lane or a currently-available number of lanes.

On the other hand, if the FBLCU determines the quantity exceeds the predetermined threshold, then the FBLCU calculates the period of time, based on a second predetermined number of lanes. This second predetermined number of lanes can be at least one more lane than a currently-available number of lanes, for example. The second predetermined number of lanes can also be the currently-available number of lanes, for example, if the currently-available number of lanes is considered a maximum.

This maximum can be fewer than the physical maximum. For example, if the communication bus 160 includes 16 lanes (e.g., a physical maximum of 16 lanes), then the FBLCU can determine the maximum lanes in any one direction is 15. For example, in the situation of a large download, the FBLCU can determine that the power state of one lane should remain in the upload direction and that the power state of the remaining 15 lanes (e.g., considered maximum) should be in the download direction.

Regarding use, the application 120 can request some transfers be completed as soon as possible. Thus, for a request for such a transfer, the FBLCU can determine the period of time is effectively zero.

In contrast, the application 120 can request a less urgent transfer, such as when a resource is sampled sparsely. For example, the application 120 can request a texture of furniture that is not rendered often in a game. Thus, for such a request, the FBLCU can determine the period of time is several seconds. The algorithm 200 then advances to S245.

In S245, the FBLCU determines a power state for at least one lane of the communication bus 160, based on the direction of traffic and quantity of data determined in S225. In some implementations, the FBLCU determines the power state for the at least one lane also based on the period calculated in S235. The FBLCU can calculate independently the power state for each direction of the lanes of the communication bus 160.

In some implementations in which the FBLCU does not calculate the period in S235, the FBLCU can determine the power state for the bus lanes based on the quantity of data of the transfer. For example, the FBLCU can determine to activate at least one additional lane of the communication bus 160, if the quantity of data for the transfer exceeds a current bandwidth in a direction by a first predetermined amount (e.g., 10%). Similarly, if the quantity of data for the transfer is below the current bandwidth by an amount greater than a second predetermined amount (e.g., 10%), then the FBLCU can determine to deactivate at least one lane of the communication bus 160. The first and second predetermined amounts can be values other than 10%. Further, the predetermined amounts are not limited to being the same as each other. For example, the first predetermined amount can be 10%, and the second predetermined amount can be 15%. The FBLCU can receive a value for the bandwidth from a hardware register.

In some implementations in which the FBLCU calculates the period of time in S235, the FBLCU can determine the power state for the bus lanes at least in part based on the period. In particular, the FBLCU first determines a minimum number of active lanes in a direction of the communication bus 160 to perform the transfer within the period. The FBLCU determines this minimum number by dividing the total number of bytes requested to be transferred by the period to produce a first quotient. The FBLCU then can divide the first quotient by the transfer rate of the lanes in the appropriate direction to produce a second quotient. The second quotient is then rounded up to determine the minimum number of active lanes. The FBLCU need not actually set the number of lanes to this minimum number of active lanes, however. For example, the minimum number of active lanes might exceed a considered maximum number of lanes. In this case, some implementations of FBLCU will set the number of active lanes to the considered maximum number of lanes.

As discussed previously, the FBLCU can also consider the opposite power state, for example, by maintaining a lane in an upload direction, even when a large download is pending. Some implementations activate all lanes in a particular direction. The algorithm 200 then advances to S255.

In S255, the FBLCU determines whether the current bus power state configuration should be modified. If the FBLCU determines the current bus power state configuration should not be modified (e.g., the current bus power state can perform the transfer in the period), then the algorithm 200 returns to S215. Thus, the FBLCU can reduce processing, if the current bus power state configuration will not be adjusted.

On the other hand, if the FBLCU determines to modify the current bus power state configuration state, then the algorithm 200 advances to S265.

In S265, the FBLCU calculates the bus lane wake or sleep initiation times. The calculation of S265 is discussed in more detail with regard to FIG. 3.

If the algorithm 200 did not calculate a period in optional S235, then the FBLCU can calculate the bus lane wake or sleep initiation time as immediate.

In other implementations in which the algorithm 200 did not calculate the period in optional S235, the FBLCU can calculate the bus lane wake or sleep as less urgent. For example, the FBLCU can calculate the bus lane wake or sleep initiation time, based on the current latency on the communication bus 160 and the bandwidth requirement for the transfer. Thus, the telemetry data can account for the duration of the transfer. If the FBLCU calculated the period in optional S235, then the FBLCU calculates the bus lane wake or sleep initiation time in S265. Specifically, the FBLCU calculates the bus lane wake or sleep initiation time based on the difference between a start time of the transfer and the wake cycle time of the lane. The FBLCU can receive the wake cycle time from a hardware register for the communication bus 160, for example. The algorithm 200 then advances to S275.

In S275, the bus lane power manager sets the power states of the lanes of the communication bus 160 at the initiation time, based on the wake or sleep initiation times calculated in S265. The algorithm 200 then advances to S285.

In S285, after the wake cycle time (or sleep cycle time) has elapsed, the host 110 or peripheral device 170 can perform the transfer using one or more lanes of the communication bus 160 in the direction of the request. For example, lanes that were awoken at the initiation time in S275 can perform the transfer. Lanes that were slept in S275 are not used in the transfer. Similarly, lanes that were maintained in an awake state at S275 can be used for the transfer, and lanes that were maintained in a sleeping state at S275 are not used for the transfer. The algorithm 200 then advances to S295.

In some implementations, a lane of the communication bus 160 awakens before the wake cycle time has elapsed or sleeps before the sleep cycle time has elapsed. In this case, if the FBLCU is informed of this early cycle completion, then the FBLCU can begin the transfer using the one or more lanes of the communication bus 160 in the direction of the request. In S295, the algorithm 200 concludes.

Figure 3:
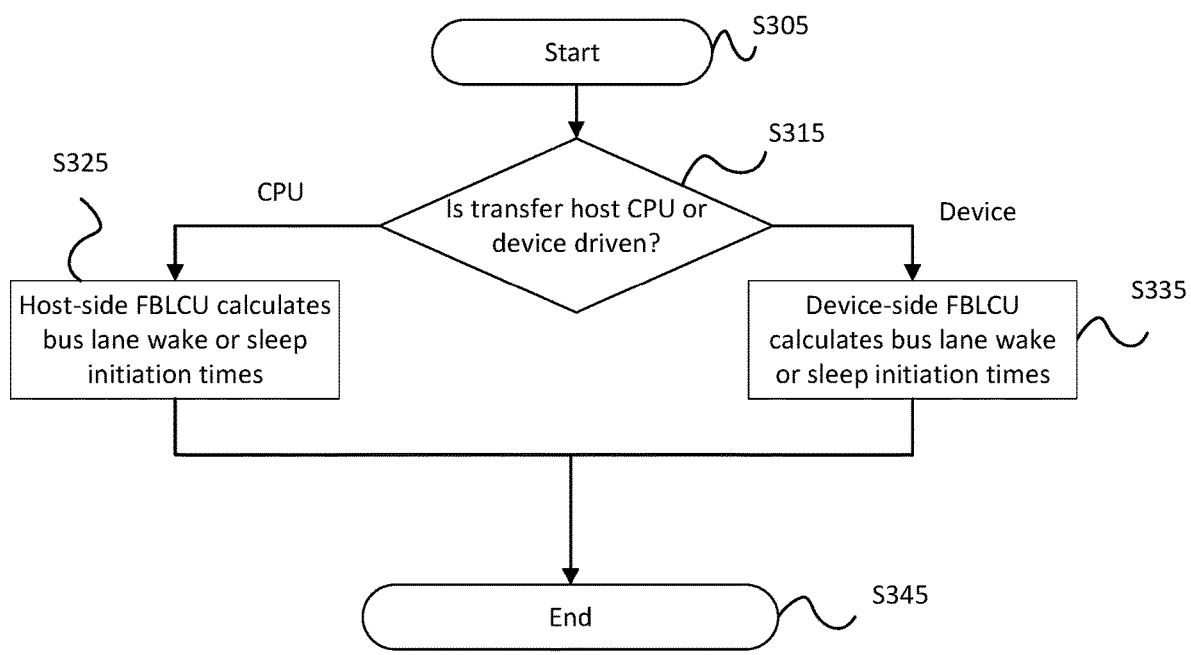
FIG. 3 shows an algorithm for calculating bus lane wake or sleep initiation times, according to an implementation of the present disclosure.

FIG. 3 illustrates an algorithm 300 for the operation performed at S265.

Algorithm 300 begins at S305 and advances to S315.

In S315, it can be determined whether the transfer is driven by the computing device 100 or the peripheral device 170. In many implementations, this determination is not explicitly performed, because using a particular FBLCU (e.g., FBLCU 140 or FBLCU 190) indicates that the entity including that FBLCU drives the transfer.

If the FBLCU determines the transfer is driven by the computing device 100, then the algorithm 300 advances to S325. If the FBLCU determines the transfer is driven by the peripheral device 170, then the algorithm 300 advances to S335.

In S325, the FBLCU 140 calculates wake or sleep initiation times for lanes of the communication bus 160. The algorithm 300 then advances to S345.

In S335, the FBLCU 190 calculates wake or sleep initiation times for lanes of the communication bus 160. The algorithm 300 then advances to S345.

In S345, the algorithm 300 ends.

Some implementations reduce the effect of wake-up latency. Therefore, in some such implementations, the FBLCU can power down underutilized lanes to achieve a power savings. For example, the FBLCU can power down a lane, in response to a determination that the traffic on the lane in a particular direction is below a predetermined threshold for a predetermined period. Alternatively, the FBLCU can also power down a lane, in response to a determination that the lane has not been used in either direction for a predetermined period.

Compared to existing methods, particular implementations of the present disclosure can ready the per-lane power states of the communication bus 160 at the beginning of a bus transfer. This readiness can reduce the impact of transition latency of the bus lanes. On GPU workloads, for example, the extremely burst-y nature of bus transfers means that elimination of this latency significantly can improve performance.

Thus, select implementations of the present disclosure can avoid a performance penalty in conventional demand-responsive solutions when insufficient lanes are in an active power state at the beginning of a burst of bus demand. Implementations also can improve efficiency by lowering power on unneeded lanes of communication bus 160 earlier than existing mechanisms, while avoiding a negative impact to performance.

In a test, a PCIe bus analyzer trace was performed for a game running on a system with a discrete GPU connected via a gen3 ×16 PCIe bus. The example considered upstream and downstream % link utilization of the communication bus over time. The upstream traffic was almost zero through the entire sample window.

At a particular time, a sudden spike in traffic to almost a peak downstream link utilization of the communication bus was observed. During this time window, the GPU was entirely bottlenecked on the latency of this PCI bus transfer.

Existing methods would begin to wake lanes of the PCI bus when the burst of traffic first appeared, thus delaying the completion of the transfer (and reducing GPU performance) by the wake cycle time of the lanes.

In contrast, with an implementation according to the present disclosure, the burst of traffic was predicted in advance by the FBLCU, and additional lanes were placed in an active state a priori, thus improving performance of the GPU overall.

On an example bus that incurs a 1.5 us wake time, and an average of one burst of traffic per ms, an implementation of the present disclosure can improve performance by at least 0.3% from latency coverage. Thus, a simulated model indicated a 0.3% performance improvement on a real-world game with an implementation of this disclosure. If bandwidth utilization is improved from the current 10% to 60%, on a PCIe 5×8 link, the link power saving is roughly 2.1 W.

An exemplary implementation could also provide power savings from use of lower per-lane power states. Similar analysis can be shown for moving lanes to lower power states, thus lowering power consumption and improving efficiency without reducing performance. Based on resource dependency to execute a command in the GPU, data can be sent in chunks over lanes of the bus 160 at a lower power state without reducing performance. In a scenario of distributed rendering with multiple GPUs, the bus lane power manager can adjust the power states of the lane based on the pipeline of operations and data dependency between the GPUs and based on synchronization with each GPU and the one or more CPUs 110.

A similar approach can be used for other peripheral devices such as network interface cards, where the device driver 130 can detect and predict the amount and timing of upcoming bus transfers.

Some implementations of the present disclosure can save power, which can be important when the computing device 100 is a battery-powered laptop computer. Further, in a premium laptop that typically has an x8 or X16 PCIe configuration, the cooling requirement for I/O can be reduced. Therefore, more sustained CPU and GPU throttle performance can be ensured without increasing the system's cooling capacity.

Turning to use cases, in a DirectStorage use case, a first peripheral device (e.g., a GPU) communicates directly with a second peripheral device (e.g., an SSD). In this scenario, peer-to-peer transactions can be performed with appropriate lanes of the communication bus 160 in appropriate power states, thus saving power while also maintaining or improving performance.

In another use case, peer-to-peer transactions between multiple GPUs can be identified. Thus, the FBLCU can set power states for each direction of each lane of the communication bus to improve power savings or performance relative to input and output.

Yet another use case concerns 3D workloads. There, the FBLCU can apply profiling to previous video frames to predict a bus load or demand for a future frame, and the FBLCU can advantageously set power states for each direction of each lane of the communication bus.

A further use case concerns megatexturing for GPUs. Megatexturing paints a single massive texture such as 32,768×32,768 pixels, rather than combine separate textures. Megatexturing tends to incur burst-y, unpredictable bus traffic. The device driver 130 can identify when an application is going to use megatextures. The BLPM 150 or BLPM 185 can set the appropriate power state for lanes of the communication bus 160 to deliver improved power use and/or performance.

Another use case concerns batching of data transfers. The device driver 130 can reorder peripheral device (e.g., GPU) operations to batch bus activity, thereby providing additional opportunities for power savings. For example, the device driver 130 can determine a queue for the communication bus 160 includes a first command list, followed by other work, then followed by a second command list. The device driver 130 then can reorder the queue so the first command list and the second command list are performed consecutively. Thus, the BLPM can keep the communication bus 160 in a higher power state for a longer consecutive period of time. Thus, overall power can be saved.

Some implementations of the present disclosure differ from conventional approaches in both the manner of prediction and the manner of saving power. For example, the FBLCU 140 can determine a demand for communication bus 160 by examining work, as the work is generated on the one or more CPUs 110. That is, the FBLCU 140 can determine the demand for the communication bus 160 before data is transmitted to the peripheral device 170. In this way, an implementation conforming to the present disclosure can examine the future, known communication load before a transfer is enacted. Thus, the bus lane power manager 150 can change the power configuration of the lanes of the communication bus 160 before a data transfer starts.

Conventional bus power consumption control includes frequency limiting users of the communication bus, frequency limiting the communication bus itself, transitioning to the communication bus to low power states, and symmetrically controlling the number of bus lanes.

Some implementations of the present disclosure can save power by asymmetrically controlling the number of active lanes in a given transmission direction of the communication bus 160. This capability does not exist in the existing PCI specification, for example.

Further, conventional PCI-based peripheral devices do not control power states of lanes of a communication bus, based on future, expected loads for the communication bus. More narrowly, conventional systems do not control a bus lane width by examining the future, expected workload in the device driver prior to submission of the work to the peripheral device or the entity driving the bus.

In the GPU space in particular, the time at which the bus load is executed on the GPU is not known or controlled directly by the one or more CPUs 110. Thus, the bus lane width can only be accurately controlled by the GPU.

In the case of a GPU for example, the device driver 130 on the one or more CPUs 110 can determine an amount of traffic at the time of command generation. Likewise, the device driver 130 can determine the quantity of traffic at command generation time for solid-state device/hard disk drive transfers.

Thus, in various implementations according to the present disclosure, the device driver 130 parses information about upcoming read/write operations. These operations have a very low complexity and represent incremental CPU work, because the device driver 130 uses the information to control widths of lanes of communication bus 160.

The additional CPU overhead attributable to the extra work can be very small. In particular, the increased power from implementing teachings of this disclosure can be extremely small in the GPU or solid-state device/hard disk drive case.

Figure 4:
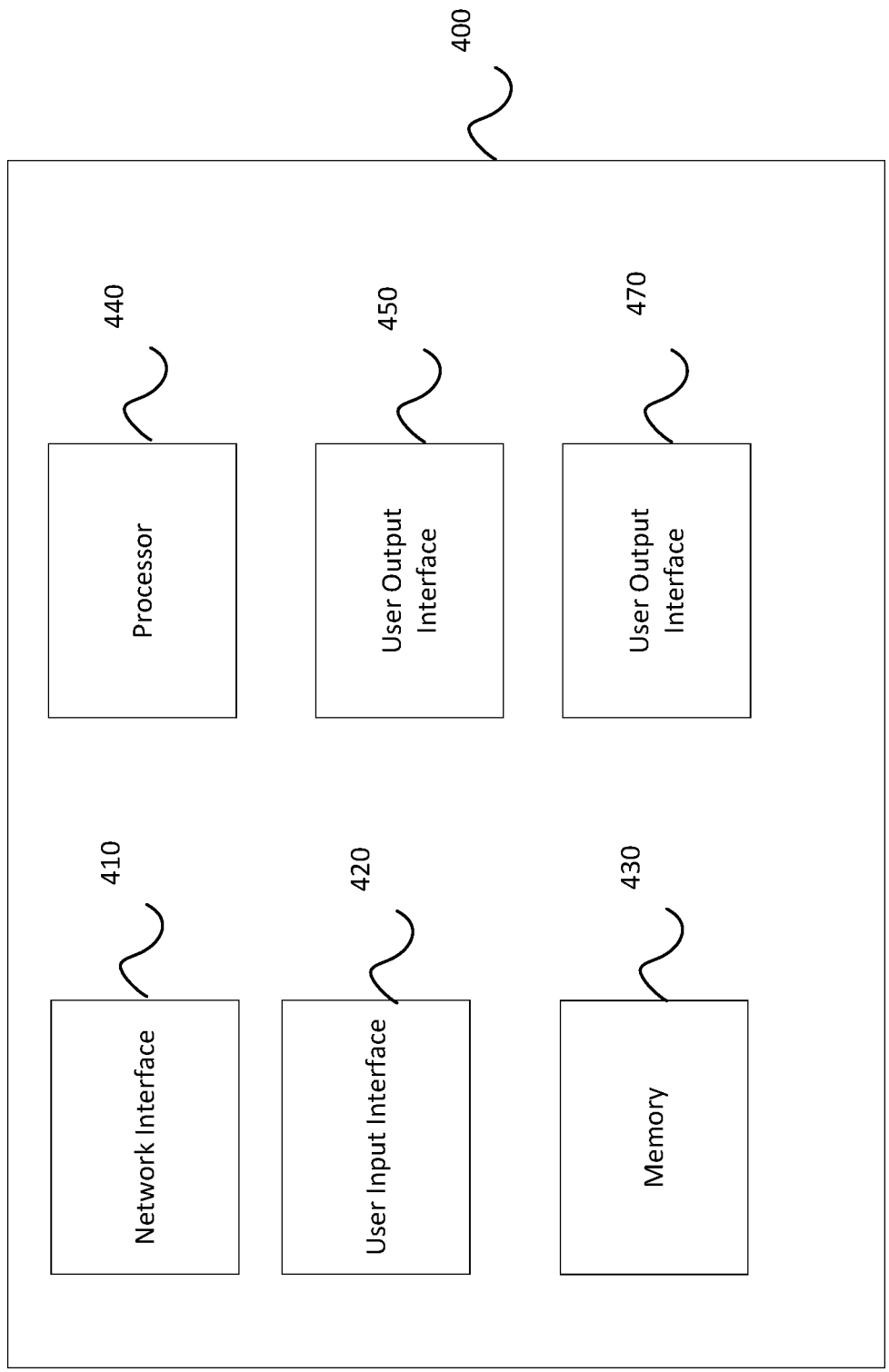
FIG. 4 illustrates a computing device, according to an implementation of the present disclosure.

FIG. 4 illustrates a computing device 400, according to an implementation of the present disclosure. The computing device 100 can be or include a computing device, as shown in FIG. 4. The computing device 400 can include network interface 410, user input interface 420, memory 430, processor 440, user output interface 450, a communication bus (not pictured), and a peripheral device 470.

Processor 440 can be or include the one or more CPUs 110. The communication bus can be or include communication bus 160. The peripheral device 470 can be or include the peripheral device 170.

Although illustrated within a single housing, the computing device 400 can be distributed across plural housings or sub-systems that cooperate in executing program instructions. In some implementations, the computing device 400 can include one or more blade server devices, standalone server devices, personal computers, routers, hubs, switches, bridges, firewall devices, intrusion detection devices, mainframe computers, network-attached storage devices, smartphones and other mobile telephones, and other types of computing devices. The system hardware can be configured according to any computer architecture, such as a Symmetric Multi-Processing (SMP) architecture or a Non-Uniform Memory Access (NUMA) architecture.

The network interface 410 provides one or more communication connections and/or includes one or more devices that allow for communication between the computing device 400 and other computing systems (not shown) over a communication network or collection of networks (not shown) or the air. The network interface can communicate using near-field communications (NFC), Wi-Fi™, Bluetooth, Ethernet, facsimile, or any other wired or wireless interface.

The computing device 400 can also include a user input interface 420 that receives inputs from a human. The user input interface can be or include a mouse, a touchpad, a keyboard, a touchscreen, a trackball, a camera, a microphone, a joystick, a game controller, a scanner, or any other input device.

The memory 430, also termed a "storage," can include or be one or more computer-readable storage media readable by the processor 440 and that store software. The memory 430 can be implemented as one storage device and can also be implemented across multiple co-located or distributed storage devices or sub-systems. The memory 43o can include additional elements, such as a controller, that communicate with the processor 440. The memory 430 can also include storage devices and/or sub-systems on which data and/or instructions are stored. The computing device 400 can access one or more storage resources to access information to carry out any of the processes indicated in this disclosure and, in particular, FIG. 2-3.

The memory 43o can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 430 can be or include resistive RAM (RRAM) or a magneto-resistive RAM (MRAM).

Software stored in memory 430 can include routines for at least partially performing at least one of the processes illustrated in FIGS. 2-3 and can be implemented in program instructions. Further, the software, when executed by the computing device 400 in general or the processor 440 specifically, can direct, among other functions, the computing device 400 or the processor 440 to perform the bus power management as described herein.

The processor 440 can be or include one or more hardware processors and/or other circuitry that retrieve and execute software from the memory 430. The processor 440 can be implemented within one processing device, chip, or package and can also be distributed across multiple processing devices, chips, packages, or sub-systems that cooperate in executing program instructions.

In some implementations, the processor 440 is or includes a Graphics Processing Unit (GPU). The GPU can benefit the visual/image processing in the computing device 400. The GPU, or any second-order processing element independent from the processor 440 dedicated to processing imagery and other perception data in real or near real-time, can provide a benefit.

The processor 440 can have any register size, such as a 32-bit register or a 64-bit register, among others. The processor 440 can include multiple cores. Implementations of the processor 440 are not limited to any particular number of threads. The processor 440 can be fabricated by any process technology, such as 14 nm process technology.

[olio] The user output interface 450 outputs information to a human user. The user output interface 450 can be or include a display (e.g., a screen), a touchscreen, one or more speakers, a printer, or a haptic feedback unit.

In implementations where the computing device 100 includes multiple computing devices, a server of the system or, in a serverless implementation, a peer can use one or more communications networks that facilitate communication among the computing devices. For example, the one or more communications networks can include or be a local area network (LAN), wide area network (WAN), or metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media," "computer-readable storage media," or "computer-readable storage medium" can refer to non-transitory storage media, such as a hard drive, a memory chip, and cache memory, and to transitory storage media, such as carrier waves or propagating signals.

Aspects of the per-lane bus power management can be implemented in various manners (e.g., as a method, a system, or a computer-readable medium). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the methods described can be performed by different processing units. Furthermore, aspects of the present disclosure can take the form of a computer program product embodied in one or more computer-readable media having computer-readable program code embodied, e.g., encoded or stored, thereon. In various implementations, such a computer program can, for example, be downloaded to (or updated on)

existing devices and systems or be stored upon manufacturing of these devices and systems.

The detailed description presents various descriptions of specific implementations. In the description, reference is made to the drawings where like reference numerals can indicate identical or functionally similar elements. Elements illustrated in the drawings are not necessarily drawn to scale. Additionally, certain implementations include more elements than illustrated in a drawing and/or a subset of the elements illustrated in a drawing. Further, some implementations incorporate a combination of features from two or more drawings.

The disclosure describes various illustrative examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve a developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The attached drawings depict spatial relationships between various components and to the spatial orientation of various aspects of components. The devices, components, members, and apparatuses can be positioned in any orientation. Thus, the use of terms such as "above," "below," "upper," "lower," "top," "bottom," or other similar terms to describe a spatial relationship between various components or to describe the spatial orientation of aspects of such components describes a relative relationship between the components or a spatial orientation of aspects of such components, respectively, as the components described can be oriented in any direction.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board or motherboard that holds various components of the internal electronic system of the electronic device and, further, provides connectors for other peripherals. More specifically, the board can provide the electrical connections by which other components of the system can communicate electrically. Any processors (inclusive of digital signal processors, microprocessors, and supporting chipsets) and computer-readable, non-transitory memory elements can be coupled to the board based on configurations, processing demands, and computer designs. Other components such as external storage, sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions that can be provided on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In certain cases, it might be easier to describe one or more of the functionalities of a given set of flows by referencing a limited number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, operations, characteristics, etc.) included in "one implementation", "example implementation", "an implementation", "another implementation", "some implementations", "various implementations", "other implementations", "select implementations", "particular implementations", "alternative implementation", and the like are intended to mean that any such features are included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

Example A1 is a method for power management of a communication bus of a computing device, the method including receiving a request for a transfer of data on the communication bus; determining a direction for the transfer, at least in part based on the request; determining a quantity of data for the transfer, at least in part based on the request; determining a power state for a lane of the communication bus, at least in part based on the direction and the quantity of data for the transfer; and setting the power state for the lane of the communication bus.

In Example A2, the subject matter of Example A1 optionally can include determining a period of time for the transfer, at least in part based on the request.

In Example A3, the subject matter of Example A2 optionally can include that the power state for the lane of the communication bus at least in part is based on the period of time for the transfer.

In Example A4, the subject matter of any of Examples A1-A3 optionally can include performing the transfer via the lane of the communication bus.

In Example A5, the subject matter of any of Examples A1-A4 optionally can include calculating a wake or sleep initiation time for the lane of the communication bus.

In Example A6, the subject matter of Example A5 optionally can include waking or sleeping the lane of the communication bus at the wake or sleep initiation time.

In Example A7, the subject matter of any of Examples A1-A6 optionally can include determining whether the transfer is driven by a central processor unit of the computing device or by a peripheral device.

Example A8 is an apparatus comprising means to perform the subject matter of any of Examples A1-A7.

Example A9 is a machine-readable medium including code, when executed, to cause a machine to perform the subject matter of any one of Examples A1-A7.

Example B1 is a non-transitory, computer-readable medium encoded with instructions that, when executed by a computer, cause the computer to perform a method comprising: receiving a request for a transfer of data on a communication bus of the computer; determining a direction for the transfer, at least in part based on the request; determining a quantity of data for the transfer, at least in part based on the request; determining a power state for a lane of the communication bus, at least in part based on the direction and the quantity of data for the transfer; and setting the power state for the lane of the communication bus.

In Example B2, the subject matter of Example B1 optionally can include the method further including determining a period of time for the transfer, at least in part based on the request.

In Example B3, the subject matter of Example B2 optionally can include that the power state for the lane of the communication bus at least in part is based on the period of time for the transfer.

In Example B4, the subject matter of any of Examples B1-B3 optionally can include the method further including performing the transfer via the lane of the communication bus.

In Example B5, the subject matter of any of Examples B1-B4 optionally can include the method further including calculating a wake or sleep initiation time for the lane of the communication bus.

In Example B6, the subject matter of Example B5 optionally can include the method further including waking or sleeping the lane of the communication bus at the wake or sleep initiation time.

In Example B7, the subject matter of any of Examples B1-B6 optionally can include the method further including determining whether the transfer is driven by a central processor unit of the computer or by a peripheral device.

Example C1 is an apparatus for power management of a communication bus of a computing device, the apparatus including a memory to include instructions; and a processor configured to execute the instructions to receive a request for a transfer of data on the communication bus; determine a direction for the transfer, at least in part based on the request; determine a quantity of data for the transfer, at least in part based on the request; determine a power state for a lane of the communication bus, at least in part based on the direction and the quantity of data for the transfer; and set the power state for the lane of the communication bus.

In Example C2, the subject matter of Example C1 optionally can include that the processor further is configured to execute the instructions to determine a period of time for the transfer, at least in part based on the request.

In Example C3, the subject matter of Example C2 optionally can include that the power state for the lane of the communication bus at least in part is based on the period of time for the transfer.

In Example C4, the subject matter of any of Examples C1-C3 optionally can include that the processor further is configured to execute the instructions to perform the transfer via the lane of the communication bus.

In Example C5, the subject matter of any of Examples C1-C4 optionally can include that the processor further is configured to execute the instructions to calculate a wake or sleep initiation time for the lane of the communication bus.

In Example C6, the subject matter of Example C5 optionally can include that the processor further is configured to execute the instructions to wake or sleep the lane of the communication bus at the wake or sleep initiation time.

In Example C7, the subject matter of any of Examples C1-C5 optionally can include that the processor further is configured to execute the instructions to determine whether the transfer is driven by a central processor unit of the computer or by a peripheral device.

Example C8 is the computing device including the subject matter of any of Examples C1-C7.

Example D1 is an apparatus for power management of a communication bus of a computing device, the apparatus including means for storing instructions; and means for executing the instructions to receive a request for a transfer of data on the communication bus; determine a direction for the transfer, at least in part based on the request; determine a quantity of data for the transfer, at least in part based on the request; determine a power state for a lane of the communication bus, at least in part based on the direction and the quantity of data for the transfer; and set the power state for the lane of the communication bus.

In Example D2, the subject matter of Example D1 optionally can include that the means for executing determines a period of time for the transfer, at least in part based on the request.

In Example D3, the subject matter of Example D2 optionally can include that the power state for the lane of the communication bus at least in part is based on the period of time for the transfer.

In Example D4, the subject matter of any of Examples D1-D3 optionally can include that the means for executing performs the transfer via the lane of the communication bus.

In Example D5, the subject matter of any of Examples D1-D4 optionally can include that the means for executing calculates a wake or sleep initiation time for the lane of the communication bus.

In Example D6, the subject matter of Example D5 optionally can include that the means for executing wakes or sleeps the lane of the communication bus at the wake or sleep initiation time.

In Example D7, the subject matter of any of Examples D1-D5 optionally can include that the means for executing determines whether the transfer is driven by a central processor unit of the computer or by a peripheral device.

Example D8 is the computing device including the subject matter of any of Examples D1-D7.

We claim:

1. A method, comprising:
   receiving a request for a transfer of data on a communication bus of a computing device;
   determining a direction for the transfer, at least in part based on the request;
   determining a quantity of data for the transfer, at least in part based on the request;
   determining a power state for a lane of the communication bus, the lane to be used for the transfer, the power state determination being at least in part based on the direction and the quantity of data for the transfer;
   setting the power state for the lane of the communication bus; and
   scheduling a wake or sleep initiation time for the lane of the communication bus.

2. The method of claim 1, further comprising:
   determining a period of time for the transfer, at least in part based on the request.

3. The method of claim 2, wherein the power state for the lane of the communication bus at least in part is based on the period of time for the transfer.

4. The method of claim 1, further comprising:
   performing the transfer via the lane of the communication bus.

5. The method of claim 1, further comprising: waking or sleeping the lane of the communication bus at the wake or sleep initiation time.

6. The method of claim 1, further comprising:
   determining whether the transfer is driven by a central processor unit of the computing device or by a peripheral device.

7. A non-transitory, computer-readable medium encoded with instructions that, when executed by a computer, cause the computer to perform a method comprising:
   receiving a request for a transfer of data on a communication bus of the computer;
   determining a direction for the transfer, at least in part based on the request;
   determining a quantity of data for the transfer, at least in part based on the request;
   determining separate power states for at least two different lanes of the communication bus, at least in part based on the direction and the quantity of data for the transfer; and
   setting the power states for the lanes of the communication bus.

8. The medium of claim 7, the method further comprising:
   determining a period of time for the transfer, at least in part based on the request.

9. The medium of claim 8, wherein the power state for the lane of the communication bus at least in part is based on the period of time for the transfer.

10. The medium of claim 7, the method further comprising:
    performing the transfer via the lane of the communication bus.

11. The medium of claim 7, the method further comprising:
    calculating a wake or sleep initiation time for the lane of the communication bus.

12. The medium of claim 11, the method further comprising:
    waking or sleeping the lane of the communication bus at the wake or sleep initiation time.

13. The medium of claim 7, the method further comprising:
    determining whether the transfer is driven by a central processor unit of the computer or by a peripheral device.

14. An apparatus, comprising:
    a memory to include instructions; and
    a processor configured to execute the instructions to
    receive a request for a transfer of data on a communication bus of a computer;
    determine a direction for the transfer, at least in part based on the request;
    determine a quantity of data for the transfer, at least in part based on the request;
    determine separate power states for at least two different lanes of the communication bus, at least in part based on the direction and the quantity of data for the transfer; and
    set the power states for the lanes of the communication bus.

15. The apparatus of claim 14, wherein the processor further is configured to execute the instructions to determine a period of time for the transfer, at least in part based on the request.

16. The apparatus of claim 15, wherein the power state for the lane of the communication bus at least in part is based on the period of time for the transfer.

17. The apparatus of claim 14, wherein the processor further is configured to execute the instructions to perform the transfer via the lane of the communication bus.

18. The apparatus of claim 14, wherein the processor further is configured to execute the instructions to calculate a wake or sleep initiation time for the lane of the communication bus.

19. The apparatus of claim 18, wherein the processor further is configured to execute the instructions to wake or sleep the lane of the communication bus at the wake or sleep initiation time.

* * * * *